(No Model.)
D. M. SHIVELY.
LOCOMOTIVE ENGINE.
No. 496,542. Patented May 2, 1893.
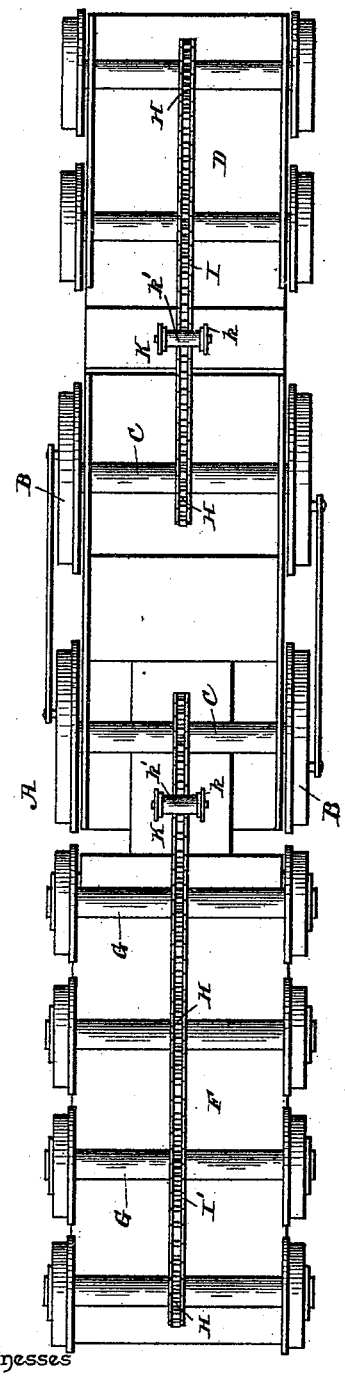
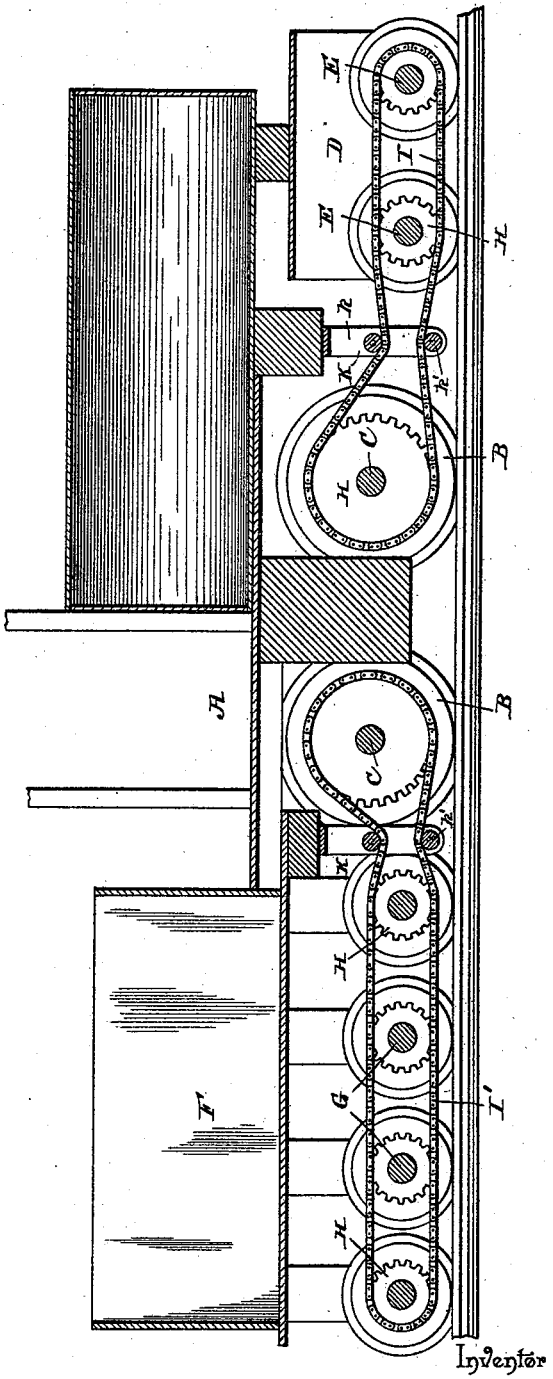
Witnesses
Harry L. Amer.
L. P. Walhaupter.
Inventor
Daniel M. Shively.
By his Attorneys,
C. A. Snow & Co.

UNITED STATES PATENT OFFICE.

DANIEL M. SHIVELY, OF FOSTORIA, OHIO.

LOCOMOTIVE-ENGINE.

SPECIFICATION forming part of Letters Patent No. 496,542, dated May 2, 1893.

Application filed June 30, 1892. Serial No. 438,615. (No model.)

*To all whom it may concern:*

Be it known that I, DANIEL M. SHIVELY, a citizen of the United States, residing at Fostoria, in the county of Seneca and State of Ohio, have invented a new and useful Locomotive-Engine, of which the following is a specification.

This invention relates to locomotive engines; and has for its object to provide an improvement in gearing for locomotive engines and the adjacent tender, so that efficient means will be provided for effectually preventing the wheels of the engine from slipping on the rails without moving forward and also for providing means whereby all the wheels connected in unison by such gearing, will be compelled to move simultaneously with each other and all act in an auxiliary capacity to assist in the movement of the cars.

To this end the main and primary object of the invention is to generally improve upon locomotive gearing.

With these and many other objects in view which will readily appear as the nature of the invention is better understood, the same consists in the novel construction, combination and arrangement of parts hereinafter more fully described, illustrated and claimed.

In the accompanying drawings;—Figure 1 is a bottom plan view of a locomotive engine and the tender provided with gearing as contemplated by this invention. Fig. 2 is a vertical longitudinal sectional view of the same.

Referring to the accompanying drawings;— A represents a locomotive engine of ordinary construction having the ordinary drive wheels B, driven in the usual manner and mounted upon each end of the axles C. The forward truck D of the locomotive also carries the wheel carrying axles E, while the tender F connected directly with the rear end of the locomotive is supported by the wheel carrying axles G. The several axles just noted are each designed by the present invention to be provided with the sprocket wheels H keyed thereon. The forward sprocket wheels of the locomotive truck axles and the front drive wheel axle sprocket are designed to be connected by the endless sprocket chain I and the several sprocket wheels of the tender axles and the rear drive wheel axle are similarly connected by the endless sprocket chain I'. Now it will be readily seen that as the drive wheels of the locomotive engine are driven in the ordinary manner motion is simultaneously communicated to the several wheels of the locomotive trucks and those of the tender so that each and every wheel secures a purchase upon the rails to propel the engine.

By the gearing just described it will be apparent that sanding the rails will be unnecessary, inasmuch as there is no possibility of the wheels slipping, and further that the gearing described acts in the capacity of a brake, so that when the drive wheels are stopped all of the other wheels connected by the same gearing with said drive wheels are likewise stopped and will not roll upon the track.

In order to provide for the tightening of the sprocket chains I and I', chain tighteners K are then employed, and consist of depending frames $k$ secured beneath the engine or tender at points intermediate of the axles and carrying upper and lower tightener or tension rollers $k'$ between which the upper and lower portions of the chain must necessarily pass and thus always keep the same at a proper tension and thereby holding the upper and lower portions of the chain positively in engagement with the upper and lower portions of the several sprockets. While the cars are in motion the chains merely revolve on the axles without hindering the working of the engine in any particular, and being noiseless in operation are specially well adapted for the purposes herein set forth.

Having thus described my invention, what I claim, and desire to secure by Letters Patent, is—

The combination with a locomotive drive wheel axle and adjacent truck axles, of sprocket wheels mounted upon said axles between the wheels, an endless chain passing continuously over and under said sprocket wheels, and a chain tightener having upper and lower tightener or tension rollers between which pass the upper and lower portions of said chain, to hold said portions of the chain positively in engagement with the upper and
5 lower portions of the several sprockets substantially as set forth.

In testimony that I claim the foregoing as my own I have hereto affixed my signature in the presence of two witnesses.

DANIEL M. SHIVELY.

Witnesses:
JACOB M. SCHATZEL,
DANIEL F. BABB.